United States Patent [19]
Schnyder et al.

[11] Patent Number: 5,240,666
[45] Date of Patent: Aug. 31, 1993

[54] APPARATUS AND METHOD FOR PRODUCING PLASTIC FOILS

[75] Inventors: Eugen Schnyder, Waltenschwil; Rolf Lehmann, Rudolfstetten, both of Switzerland

[73] Assignee: Sulzer Escher Wyss AG, Zurich, Switzerland

[21] Appl. No.: 874,104

[22] Filed: Apr. 27, 1992

[30] Foreign Application Priority Data

May 3, 1991 [CH] Switzerland .............................. 330/91

[51] Int. Cl.⁵ ............................................. B29C 47/88
[52] U.S. Cl. ................................ 264/175; 264/210.2;
264/237; 264/348; 425/143; 425/363; 492/7;
492/38; 492/46
[58] Field of Search ................. 264/210.2, 348, 237,
264/556, 175; 425/363, 327, 367, 143; 29/113.2,
116.2; 492/7, 38, 46, 47

[56] References Cited

U.S. PATENT DOCUMENTS

| 1,954,027 | 4/1934 | Smith . | |
|---|---|---|---|
| 3,802,044 | 4/1974 | Spillmann et al. . | |
| 3,820,933 | 6/1974 | Aspin | 425/367 |
| 3,885,283 | 5/1975 | Biondetti . | |
| 4,058,877 | 11/1977 | Lehmann . | |
| 4,363,615 | 12/1982 | Bolender | 425/363 |
| 4,422,318 | 12/1983 | Christ et al. . | |
| 4,573,402 | 3/1986 | Sharma et al. | 29/116.2 |
| 4,583,273 | 4/1986 | Schnyder et al. . | |
| 4,597,275 | 7/1986 | Schneid | 425/367 |
| 4,850,088 | 7/1989 | Speak | 29/116.2 |
| 5,075,060 | 12/1991 | Imataki | 264/210.2 |
| 5,111,566 | 5/1992 | Schnyder et al. | 29/113.2 |
| 5,147,592 | 9/1992 | Sato et al. | 264/210.2 |

FOREIGN PATENT DOCUMENTS

| 0165750 | 12/1985 | European Pat. Off. . | |
|---|---|---|---|
| 3300251 | 8/1983 | Fed. Rep. of Germany . | |
| 3305429 | 8/1984 | Fed. Rep. of Germany | 425/363 |
| 2178509 | 2/1987 | United Kingdom . | |
| 2187407 | 9/1987 | United Kingdom . | |

OTHER PUBLICATIONS

A copy of abandoned U.S. Patent Application Ser. No. 06/456,318.

Primary Examiner—Jeffery Thurlow
Attorney, Agent, or Firm—Sandler Greenblum & Bernstein

[57] ABSTRACT

In the plastic foil-producing apparatus where a fluent plastic mass is cooled in a roll nip between a roller member and a counter roller to a defined predetermined solidification temperature, the roller member includes a non-rotatable support member and a rotatable roller shell supported at the non-rotatable support member by one or more support elements. The roller shell includes a plurality of coaxial zones, namely, an inner soft rubber zone and a thin outer metallic zone possessing good thermal conductivity, for example, formed of copper or silver or alloys thereof, the outer surface of which is mirror smooth, for instance, chromium plated. The roller surface is cooled by cooling gas nozzles regulated by a temperature sensor, so that the temperature of the roller member in the roll nip assumes an exactly defined temperature. Consequently, there can be fabricated a plastic foil, for example, formed of polyethylene having a narrow solidification temperature range and possessing a defined thickness profile while preventing sticking of the plastic foil at the outer surface of the roller member.

14 Claims, 1 Drawing Sheet

APPARATUS AND METHOD FOR PRODUCING PLASTIC FOILS

BACKGROUND OF THE INVENTION
1. Field of the Invention

The present invention relates to a new and improved apparatus and method for producing plastic foils or films or the like.

Generally speaking, the apparatus or installation of the present development for the production of plastic foils or films is of the type comprising a roller or roller member provided with a non-rotatable support or carrier member and a roller shell or jacket rotatable about the non-rotatable support or carrier member. This roller shell or jacket is supported at the non-rotatable support or carrier member by means of at least one support or pressure element—also known as a pressure-exerting or pressing element—exerting a support force in a pressing plane. Moreover, the roller shell or jacket cooperates with a counter roller or roll in such a manner that a fluent or flowable plastic material introduced into the nip or gap between the roller shell and the counter roller is cooled to a predetermined or desired solidification temperature.

2. Discussion of the Background and Material Information

Such apparatus for the production of plastic foils or films or plates are known to the art, for example, from the commonly assigned German Published Patent Application No. 3,300,251, published Aug. 4, 1983. The fluent or flowable plastic mass is conveyed between two rollers and, during solidification of the plastic mass, the one roller constructed as a controlled deflection roller is regulated so as to produce a predetermined thickness profile of the fabricated foil or plate or the like by means of the regulatable support force of the support elements. This controlled deflection roller contains a single zone roll shell or jacket. However, such prior art foil or plate production apparatus is rather unsuitable for processing certain plastic materials which display a relatively sudden transition between their fluent and solid states throughout a relatively narrow temperature range. On the one hand, when processing such relatively rapidly solidifying plastics, for instance, polyethylene, the foil pressing and thickness regulation operation must take place at an exactly defined point in time at a relatively exact temperature. However, this is not required to that degree in the case of thermoplastic materials having a relatively large solidification range. On the other hand, rapidly solidifying plastics, during their solidification, tend to stick at the usually employed roller surfaces.

SUMMARY OF THE INVENTION

Therefore, with the foregoing in mind, it is a primary object of the present invention to provide an improved apparatus and method for producing plastic foils or films or the like in a manner not afflicted with the aforementioned limitations and drawbacks of the prior art.

Another and more specific object of the present invention aims at providing an improved apparatus and method for producing plastic foils or films while eliminating the aforementioned drawbacks of the prior art and, in particular, concerns devising an apparatus for producing plastic foils or films or the like especially from rapidly solidifying plastics and which enables the employment of a support force regulation while maintaining narrower temperature tolerances, and wherein there can be extensively avoided adherence or sticking of the solidifying plastic material to the surface of the employed rollers.

Now in order to implement these and still further objects of the present invention, which will become more readily apparent as the description proceeds, the apparatus of the present development for producing plastic foils or films or the like is manifested, among other things, by the features that the roller shell or jacket comprises a plurality of coaxially arranged zones formed of different materials. Such plurality of coaxially arranged zones comprises an inner zone having a rubber-soft elasticity and at least one outer thin metallic zone possessing good thermal conductivity and a solid smooth surface. This at least one outer thin metallic zone can be cooled to a predetermined temperature by a cooling device extending over at least a portion of the roller surface of the roller member.

The rollers disclosed in the commonly assigned United Kingdom Published Patent Application No. 2,178,509, published Feb. 11, 1987, containing a multi-zone shell and a smooth chilled cast iron outer surface and used for calendering a paper web and so forth at variable temperatures, are not suitable for use in an apparatus for producing plastic foils.

Also the rollers disclosed in European Published Patent Application No. 165,750, published Dec. 27, 1985, for the treatment of the surface of a thermoplastic film, for instance, in an embossing calender, are unsuitable for the production of plastic foils possessing a narrow solidification range, for example, polyethylene foils.

Therefore, further according to the present invention, the outermost zone of the roller comprises a metal having a mirror-smooth and high polish or high mirror finish surface, so that there can be positively prevented sticking or adherence of the plastic material.

Advantageously, there is provided one zone having as great as possible thermal conductivity. In this regard, such zone can be constituted by the outermost high polish zone, or else can be constituted by a zone situated directly beneath the high polish layer of the high polish zone and formed of a different material and possessing a high thermal conductivity, for example, composed of copper or silver or alloys thereof, and internally of which there merges a thicker zone formed of a rubber elastic elastomer or elastomeric material.

This rubber elastic or elastomeric zone can constitute, for example, the innermost layer. In the case of rollers or roller members working with hydrostatic support or pressure elements it is, however, advantageous to provide as the innermost zone within the rubber elastic zone additional thin rigid travel or running surfaces, for example, formed of metal, as the bearing surfaces of the support or pressure elements.

Still further according to the present invention, the cooling device can be constructed, for example, like the externally effective fluid-cooling devices known for other uses from, for instance, U.S. Pat. No. 4,422,318, granted Dec. 27, 1983, U.S. Pat. No. 1,954,027, granted Apr. 10, 1934, and United Kingdom Published Patent Application No. 2,187,407, published Sep. 9, 1987. Such cooling devices are provided, for instance, with cooling gas nozzles and cooperate with a suitable temperature regulation device.

As to a further aspect of the present invention, the inner zone which has a rubber-soft elasticity possesses a Shore-hardness A in a range between 40 and 90, preferably has a Shore-hardness A of approximately 60.

It is further contemplated that the at least one outer thin metallic zone which possesses good thermal conductivity is formed of copper or silver or an alloy of such metals.

Moreover, such at least one outer thin metallic zone advantageously has a thickness of at most 1 mm.

Furthermore, the surface of the outermost zone can comprise a high polish outer surface defined by, for instance, a chromium plated outer surface.

According to a further feature, a temperature sensor is provided at the region of the entry side of the roller member into the roll nip for measuring the temperature of the outer surface of the outermost zone at a predetermined measuring site, and this temperature sensor controls the cooling device such that the temperature prevailing at the measuring site of the temperature sensor is regulated to a predetermined temperature value.

The cooling device can advantageously comprise a plurality of cooling gas nozzles for conducting a cooling gas onto the outer surface of the outermost zone.

As alluded to above, the present invention further relates to a method of producing plastic foils or the like which entails providing a roller member equipped with a roller shell rotatable about a non-rotatable support member and a counter roller coacting with the roller shell of the roller member to form therebetween a roll nip. The roller shell comprises a plurality of coaxially arranged zones formed of different materials, and specifically, an inner zone having a rubber-soft elasticity, and at least one outer thin metallic zone possessing good thermal conductivity and a solid smooth surface. A fluent plastic material having a narrow solidification temperature range or band is introduced into the roll nip between the roller shell and the counter roller, and the introduced fluent plastic material is cooled to a predetermined solidification temperature by means of a cooling device extending over at least a portion of the outer surface of the roller member. Still further, it is contemplated to introduce polyethylene as the fluent plastic material having the narrow solidification temperature range into the roll nip between the roller shell and the counter roller.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that only enough of the construction of the apparatus for producing plastic foils or films or the like according to the present invention has been depicted therein, in order to simplify the illustration, as needed for those skilled in the art to readily understand the underlying principles and concepts of the present invention.

Figure 1:
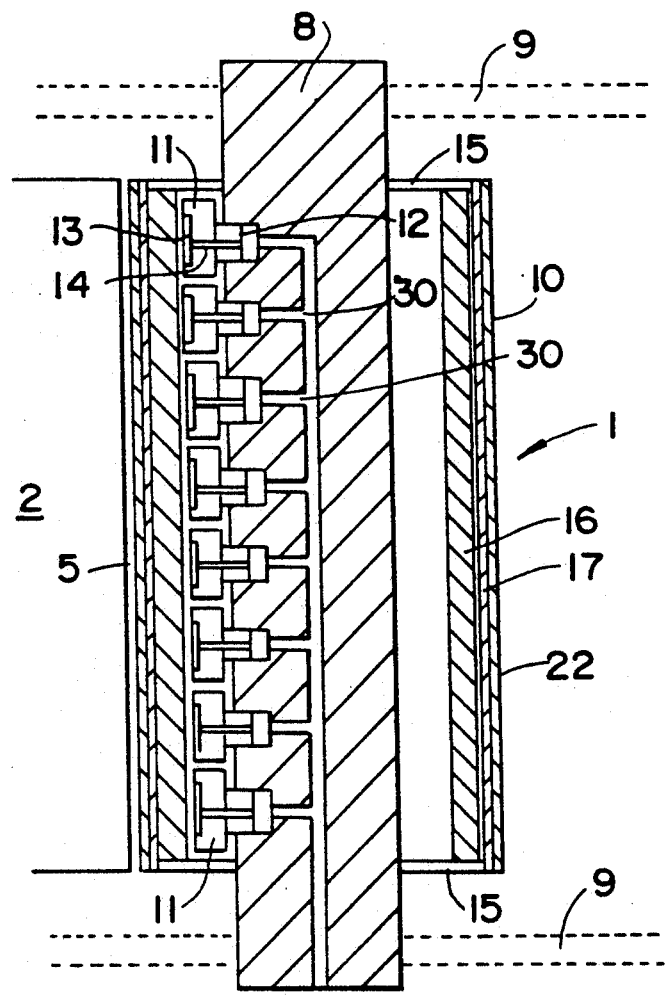
FIG. 1 is a horizontal axial cross-sectional view of a roller or roller member employed in an apparatus for producing plastic foils or films or the like according to the present invention.
Figure 2:
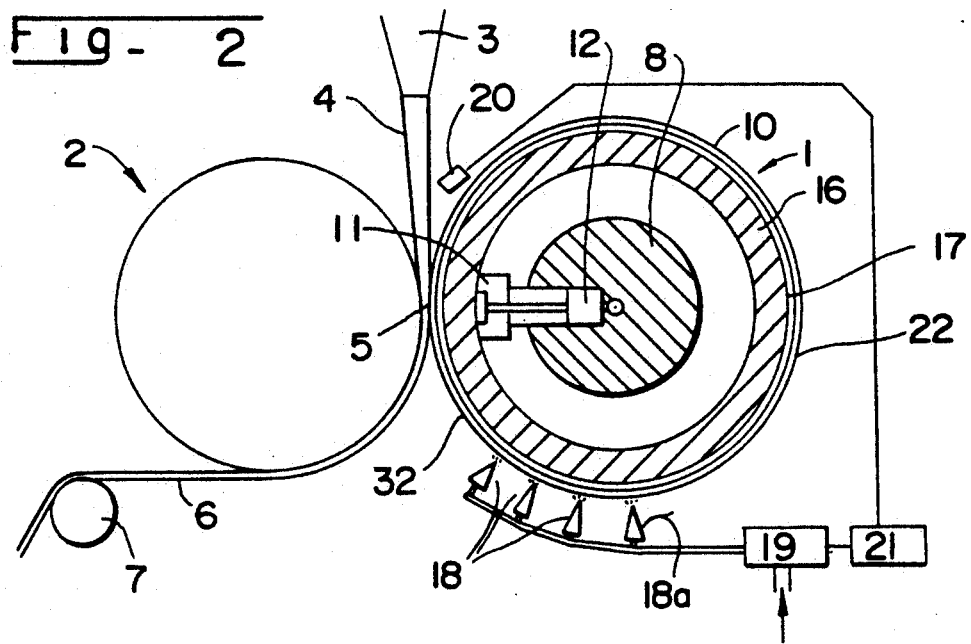
FIG. 2 depicts an exemplary embodiment of apparatus in radial sectional view for producing plastic foils or films or the like and containing the roller or roller member depicted in FIG. 1.

Turning attention now to FIGS. 1 and 2 of the drawings, the depicted apparatus or installation will be seen to comprise a controlled deflection roller or roll 1 which cooperates with a counter roller or roll 2 which can be constructed as a conventional solid or hollow roller or, however, also can be likewise constructed as a controlled deflection roller. A suitable fluent or flowable plastic material or mass 4 flows out of an extruder 3 or equivalent structure into a roll nip or gap 5 formed between the coacting rollers 1 and 2 and solidifies at that location so as to form a plastic foil or film 6 which is withdrawn by means of a deflection roller or roll 7.

The controlled deflection roller or roller member 1 comprises a support or carrier member 8 which is mounted to be non-rotatable but, however, pivotable through a limited extent in a roll stand or framework 9, as such has been described in greater detail in U.S. Pat. No. 3,802,044, granted Apr. 9, 1974, and U.S. Pat. No. 3,855,283, granted May 27, 1975, to which reference may be readily had and the disclosures of which are incorporated herein in their entirety by reference. Furthermore, a roller shell or jacket 10 is supported at the support member 8 by means of a row of support or pressure elements 11 and can rotate about such support member 8. As far as the support or pressure elements 11 are concerned such can be constituted, for example, by hydrostatic support elements as disclosed, for example, in the aforementioned U.S. Pat. No. 3,802,044. These hydrostatic support elements 11 are displaceable in the shell supporting direction in respective cylinders or cylinder guides 12 provided in the support member 8, these cylinders 12 each being supplied with a suitable hydraulic pressurized fluid medium via the supply lines or ducts 30. Each of the hydrostatic support elements 11 is provided at its front face or side with a hydrostatic bearing surface or pocket 13 to which there is delivered, by means of an associated throttle bore 14 from the related cylinder 12, a hydraulic medium and enables a relatively frictionless rotation of the roller shell or jacket 10.

Instead of using hydrostatic support or pressure elements it would be possible, however, to use other types of support or pressure elements, for instance, conventional hydrodynamic support elements, pressure cushions, pressure chambers, and electromagnetic, pneumatic or mechanical support elements.

In any event these support elements 11 can be supplied either collectively, in groups or individually, with the pressurized fluid medium whose pressure can be appropriately regulated or controlled. As a result, there can be produced across the width of the roll nip or gap 5, and specifically across the there formed plastic foil or film 6, an individually adjustably pressure and a desired thickness profile of such plastic foil or film 6 after emerging from the roll nip or gap 5. In order to achieve a fine or precise profile regulation, it is advantageous to arrange adjacent one another a plurality of support or pressure elements 11 and to power such by a suitable pressurized fluid medium, wherein there can be individually regulated the fluid medium pressure exerted at each support element 11 or at least individual groups of such support elements 11. In order to carry out a film thickness profile regulation of the first order, under certain circumstances it is, however, sufficient to employ a single support element in the form of a support ledge extending over the width of the roll nip 5 or a pressure chamber or compartment supplied by means of a single conduit or line with pressurized fluid medium at a regulatable pressure, and in conjunction with the mounting of the roll shell 10 at the support or carrier member 8 at the opposed ends of the roller shell 10 enables a profile regulation of the first order, that is to say, between the central region of the roller and the roller end regions It is advantageous to seal the roller ends of the controlled deflection roller or roller member 1 by means of seals 15 which in known manner also can be constructed for mounting the roller shell or jacket 10 at the support member s or for guiding the ends of the roller shell or jacket 10 in the support or pressing direction as such has been disclosed, for instance, in the aforementioned U.S. Pat. No. 3,855,283.

In order to beneficially employ the previously described arrangement for the production of plastic foils or films or like having a narrow solidification temperature range of several degrees centigrade, for example, foils or films produced from polyethylene, it is necessary to maintain constant the temperature in the roll or roller nip 5 between both of the rollers 1 and 2, where there occurs the sudden solification of the plastic mass, within a relatively narrow tolerance of several degrees centigrade, since only in this manner can there be achieved with the required precision the desired or predetermined thickness profile of the plastic foil or film 6 formed in the roll nip 5. Also there must be prevented sticking of the plastic foil or film 6 formed in the roll nip 5 at the outer surface of the controlled deflection roller or roller member 1.

In order to achieve this objective the roller shell or jacket 10 is formed of a number of coaxial or coaxially arranged layers. Regarding the inner layer such is constituted by a relatively thick layer 16 having rubber-soft elasticity. In this context there is to be understood a layer formed, for example, of soft rubber or a material possessing analogous elasticity, for instance, an other elastomer having a Shore-hardness A between 40 and 95, preferably in the order of about 60 Shore-hardness A. An inner layer or core zone 16 of such softness and plasticity affords a sufficiently flexible regulation of the support forces throughout the roller width, that is, in the direction of the lengthwise axis of the roller, and thus, a sufficiently precise or fine profile regulation of the produced plastic foil or film or the like throughout the width thereof.

Within this rubber-soft inner layer or core zone 16 there can be provided metallic travel rings as the bearing surfaces of the support or pressure elements 11 and which enable an exact mounting or support of the roller shell 10, a disturbance-free rotation of such roller shell 10 about the support or carrier member 8 and an exact force transmission from the support or pressure elements 11 to the roller shell 10 as is known, for instance, from U.S. Pat. No. 4,058,877, granted Nov. 22, 1977, and U.S. Pat. No. 4,583,273, granted Apr. 22, 1986, to which reference may be readily had and the disclosures of which are likewise incorporated herein in their entirety by reference.

Controlled deflection rollers or rolls of the aforedescribed type containing a rubber-soft roller shell indeed possess the elasticity and flexibility needed for use in a plastic foil-production apparatus, however, the thermal conductivity of soft rubber and similar elastomers is so poor that there cannot be taken up by the roller surface at the region of the roll nip 5 such quantity of thermal energy or heat from the fluent or flowable thermoplastic mass 4 that there can occur a defined solidification thereof so as to produce the plastic foil or film 6. Special measures are therefore needed in order to maintain an exactly defined solidification temperature in the roll nip 5. For this purpose a thin layer 17 having particularly good thermal conductivity is externally applied to the inner layer or core zone 16 of the roller shell or jacket 10. Metallic layers, for example, formed of copper or silver or alloys of such metals, are particularly suitable for this purpose. The thickness of this metallic layer 17 is selected such that the metallic layer 17 can absorb a sufficient amount of heat from the thermoplastic or plastic mass 4, so that rapid cooling of the plastic foil or film 6 to the requisite solidification temperature thereof takes place in the roll nip 5. As a general rule, a layer thickness of at most 1 mm. or less of the thin metallic layer 17 is sufficient.

So as to be able to exactly regulate this surface temperature of the controlled deflection roller or roller member 1 at the region of the roll nip 5 to a predetermined value, a cooling device or devices 18 are arranged at the outer side of the controlled deflection roller or roller member 1 and which extend throughout at least a portion of the roller circumference or periphery. These cooling devices 18 are advantageously constructed as fluid nozzles, especially as cooling gas nozzles 18a, which blow a predetermined cooling gas or coolant against the outer surface 32 of the controlled deflection roller or roller member 1 and extract the heat removed from the plastic mass 4 of the plastic foil or film 6 in the roll nip 5. These gas nozzles 18a of the cooling device or devices 18 are operated by a ventilator or fan 19 which sucks up air from the ambient region and conducts such sucked-up air through the gas nozzles 18a onto the outer surface 32 of the controlled deflection roller 1. The ventilator 19 is controlled by a temperature sensor or feeler 20 located forwardly of the point of entry of the plastic mass or material 4 into the roll nip 5. This temperature sensor or feeler 20 senses the temperature of the roll surface 32 of the controlled deflection roller or roller member 1 shortly prior to entry into the roll nip 5 and controls the ventilator 19 or the like by means of a regulator 21 such that the temperature measured by the temperature sensor or feeler 20 at such measuring site or location corresponds to a predetermined reference or set value.

To prevent adhesion of the solidifying plastic mass 4 at the outer surface 32 of the controlled deflection roller or roller member 1, such roller outer surface is constructed to be mirror smooth or of high polish or gloss. This can be readily achieved by suitable material selection and treatment of the high thermally conductive layer, for example, by polishing the thin metallic layer 17 formed of, for example, silver or a silver alloy, or by applying a very thin, for instance, about 0.1 mm. thick further layer 22 to the high thermally conductive layer 17, for example, by chromium plating the high thermally conductive layer which then can be formed of, for example, copper.

The counter roller 2 can be constructed analogous to the controlled deflection roller 1 or can be constructed as a solid roller or a hollow roller having a likewise mirror smooth outer surface.

According to a practical embodiment of plastic foil producing apparatus which satisfies the imposed requirements for processing polyethylene having a solidification temperature of about 60° C. and a foil width or roller width of approximately 6 meters, and a diameter of the controlled deflection roller or roller member of 40 cm., the inner layer or core zone 16 of the roller shell or jacket 10 having a thickness of about 8 cm. was formed of soft rubber of a Shore-hardness A of about 62, at the outer surface or side of which there was arranged a 0.2 mm. thick layer formed of copper and whose outer surface was chromium plated to possess a mirror smooth outer surface.

While there are shown and described present preferred embodiments of the invention, it is distinctly to be understood the invention is not limited thereto, but may be otherwise variously embodied and practiced within the scope of the following claims.

What is claimed is:

1. An apparatus for the production of plastic foils, comprising:
   a roller member provided with a roller shell and a non-rotatable support member;
   the roller shell being rotatable about the non-rotatable support member;
   the roller member further including at least one support element exerting a support force in a pressing plane for supporting the roller shell at the non-rotatable support member;
   a counter roller coacting with the roller shell of the roller member to form therebetween a roll nip;
   the roller shell cooperating with the counter roller in such a manner that a fluent plastic material introduced into the roll nip between the roller shell and the counter roller is cooled to a predetermined solidification temperature;
   the roller shell comprising a plurality of coaxially arranged zones formed of different materials;
   said plurality of coaxially arranged zones of the roller shell comprising:
      an inner zone having a rubber-soft elasticity; and
      at least one outer thin metallic zone possessing good thermal conductivity and a solid smooth surface; and
   a cooling device extending over at least a portion of an outer surface of the roller member for cooling the outer thin metallic zone to a predetermined temperature.

2. The apparatus for the production of plastic foils according to claim 1, wherein:
   said inner zone having a rubber-soft elasticity possesses a Shore-hardness A in a range between 40 and 90.

3. The apparatus for the production of plastic foils according to claim 2, wherein:
   said inner zone possesses a Shore-hardness A of approximately 60.

4. The apparatus for the production of plastic foils according to claim 1, wherein:
   said at least one outer thin metallic zone which possesses good thermal conductivity is formed of a material selected from the group essentially consisting of copper and silver and alloys of such metals.

5. The apparatus for the production of plastic foils according to claim 1, wherein:
   said at least one outer thin metallic zone which possesses good thermal conductivity has a thickness of at most 1 mm.

6. The apparatus for the production of plastic foils according to claim 1, wherein:
   said at least one outer thin metallic zone has a high polish outer surface.

7. The apparatus for the production of plastic foils according to claim 6, wherein:
   said at least one outer thin metallic zone having a high polish outer surface comprises a chromium plated outer surface.

8. The apparatus for the production of plastic foils according to claim 1, wherein:
   the roller member has an entry side extending towards the roll nip;
   a temperature sensor provided at the region of the entry side of the roller member for measuring the temperature of the outer surface of the at least one outer thin metallic zone at a predetermined measuring site; and
   said temperature sensor controlling the cooling device such that the temperature prevailing at the measuring site of the temperature sensor is regulated to a predetermined temperature value.

9. The apparatus for the production of plastic foils according to claim 1, wherein:
   the cooling device comprises a plurality of cooling gas nozzles for conducting a cooling gas onto the outer surface of the at least one outer thin metallic zone.

10. The apparatus for the production of plastic foils according to claim 1, wherein:
    the roller member comprises a controlled deflection roll.

11. The apparatus for the production of plastic foils according to claim 1, wherein:
    said at least one outer thin metallic zone includes a chromium plated outer surface.

12. A roller structure for use in an apparatus for the production of plastic foils, comprising:
    a roller member provided with a roller shell and a non-rotatable support member;
    the roller shell being rotatable about the non-rotatable support member;
    the roller member including at least one support element exerting a support force in a pressing plane for supporting the roller shell at the non-rotatable support member;
    the roller member being intended to coact with a counter roller cooperating with the roller shell of the roller member for forming therebetween a roll nip into which there is introduced a fluent plastic material which is to be cooled to a predetermined solidification temperature;
    the roller shell comprising a plurality of coaxially arranged zones formed of different materials;
    said plurality of coaxially arranged zones of the roller shell comprising:
       an inner zone having a rubber-soft elasticity; and
       at least one outer thin metallic zone possessing good thermal conductivity and a solid smooth surface.

13. A method of producing plastic foils, comprising the steps of:
    providing a roller member equipped with a roller shell rotatable about a non-rotatable support member and a counter roller coacting with the roller shell of the roller member to form therebetween a roll nip;
    the roller shell comprising a plurality of coaxially arranged zones formed of different materials which include an inner zone having a rubber-soft elasticity, and at least one outer thin metallic zone possessing good thermal conductivity and a solid smooth surface;

introducing a fluent plastic material having a narrow solidification temperature range into the roll nip between the roller shell and the counter roller; and cooling the outer thin metallic zone to a predetermined temperature by means of a cooling device extending over at least a portion of the outer surface of the roller member so that the fluent plastic material having the narrow solidification temperature range and introduced into the roll nip is cooled to a predetermined solidification temperature.

14. The method of producing plastic foils according to claim 13, further including the step of:

introducing polyethylene as the fluent plastic material having the narrow solidification temperature range into the roll nip between the roller shell and the counter roller.

* * * * *